United States Patent
Sekiguchi et al.

(10) Patent No.: US 7,196,267 B2
(45) Date of Patent: Mar. 27, 2007

(54) ELECTRICALLY INSULATING RESIN COMPOSITION AND A DC ELECTRIC WIRE OR CABLE BOTH COATED THEREWITH

(75) Inventors: Yoitsu Sekiguchi, Osaka (JP); Toshikazu Shibata, Yokohama (JP); Ken-ichi Hirotsu, Osaka (JP); Tsuyoshi Uozumi, Osaka (JP); Hirofumi Hirota, Osaka (JP)

(73) Assignee: Sumitomo Electric Industries, Inc., Tokyo (JP)

( * ) Notice: Subject to any disclaimer, the term of this patent is extended or adjusted under 35 U.S.C. 154(b) by 428 days.

(21) Appl. No.: 10/240,519

(22) PCT Filed: Mar. 29, 2001

(86) PCT No.: PCT/JP01/02608

§ 371 (c)(1),
(2), (4) Date: Sep. 30, 2002

(87) PCT Pub. No.: WO01/75904

PCT Pub. Date: Oct. 11, 2001

(65) Prior Publication Data

US 2003/0149176 A1   Aug. 7, 2003

(30) Foreign Application Priority Data

Mar. 31, 2000   (JP) .............................. 2000-099236

(51) Int. Cl.
*H01B 3/44* (2006.01)
(52) U.S. Cl. .............................. 174/68.1; 174/120 SC
(58) Field of Classification Search .......... 174/120 SC, 174/68.1; 525/193
See application file for complete search history.

(56) References Cited

U.S. PATENT DOCUMENTS

| | | | |
|---|---|---|---|
| 4,575,184 A | | 3/1986 | Ueno et al. |
| 5,985,181 A | * | 11/1999 | Yoshida et al. ............. 252/511 |
| 6,372,344 B1 | * | 4/2002 | Castellani et al. ........... 428/379 |

FOREIGN PATENT DOCUMENTS

| | | |
|---|---|---|
| JP | 01-243305 A | 9/1989 |
| JP | 05-198217 A | 8/1993 |
| JP | 6-349336 | 12/1994 |
| JP | 9-25373 | 1/1997 |
| JP | 10-237237 | 9/1998 |
| JP | 10-279769 | * 10/1998 |
| JP | 11-029816 A | 2/1999 |
| JP | 11-134942 | 5/1999 |
| JP | 11-224543 A | 8/1999 |
| JP | 11-339564 | 12/1999 |
| SU | 1031991 A1 | 7/1983 |

OTHER PUBLICATIONS

International Search Report, dated Jun. 27, 2001, for PCT Application No. PCT/JP01/02608, 2 pps.

* cited by examiner

*Primary Examiner*—Jeffrey Mullis
(74) *Attorney, Agent, or Firm*—Smith, Gambrell & Russell

(57) ABSTRACT

An object of the present invention is to provide an electrically insulative resin composition that exhibits superior electrical properties and processability and an electric wire or cable having a covering made of the resin. The electrically insulative resin composition comprises 60 to 90 percent by weight of ethylene-α-olefin copolymer (A) polymerized with a single-site catalyst and 40 to 10 percent by weight of another polyolefin resin (B), which is other than (A), wherein the composition contains a polyolefin having a graft-polymerized substituent with a dipole moment of not less than 4 Debye.

3 Claims, No Drawings

ELECTRICALLY INSULATING RESIN COMPOSITION AND A DC ELECTRIC WIRE OR CABLE BOTH COATED THEREWITH

TECHNICAL FIELD

The present invention relates to electrically insulative resin compositions and DC electric wires and cables covered with the resin compositions.

BACKGROUND ART

Crosslinked polyethylene has been used as an insulating material for power cables. Such crosslinked polyethylene is formed by blending high-pressure low-density polyethylene (hereinafter referred to as LDPE) having a superior insulation property with a crosslinking agent (generally an organic peroxide) and an antioxidant, and crosslinking the molecular chains of the LDPE so that it has improved heat resistance. The crosslinked polyethylene is an excellent insulating material for alternating current (AC) transmission.

In recent years, direct current (DC) transmission, which is highly efficient for long distance lines, has been investigated; however, crosslinked polyethylene for AC cables is not resistant to polarity reversal and is thus not practical for DC transmission.

Dielectric breakdown during polarity reversal occurs because an electric field is distorted around the electrode by space charge accumulated in the insulating material and the electric field increases to twofold at polarity reversal. The electrical breakdown can be solved by providing a space charge trap site in the insulating material, as disclosed in Japanese Unexamined Patent Application Laid Open Nos. 1999-134942 and 1993-198217.

With the recent development of catalytic techniques, an ethylene-α-olefin copolymer prepared using a single-site catalyst (hereinafter referred to as sLLDPE) has been developed. As compared with an ethylene-α-olefin copolymer using a conventional Ziegler-Natta catalyst (hereinafter referred to as zLLDPE), it has become possible to obtain LLDPE having a uniform molecular weight distribution and uniform composition distribution, since the reaction site is uniform because of the use of the single-site catalyst. It is known that the highly uniform sLLDPE exhibits improved impact resistance it contains a reduced amount of low molecular weight component that decreases mechanical strength, and the number of tied-molecules in the lamella structure increases. Thus, since an improvement in impulse resistance, which is an electrical impact, can be anticipated, its use of sLLDPE as an electrical insulator has been proposed (Japanese Unexamined Patent Application Laid Open No. 1999-29616).

The combination of the above two technologies was expected to enable an insulating material to have high DC electrical properties; however, it has been revealed that this material exhibits extremely poor extrudability. That is, the uniformity of the molecular weight distribution of the sLLDPE has several problems: the resin pressure increases if extrusion is performed at the same temperature as that for LDPE; the surface of the extrusion moldings tends to have a rough skin due to low melt tension; and the processability is poor due to low melt tension (like starch syrup).

Some attempts have been done to improve the processability by blending the sLLDPE with other polyolefin resins; however, no useful technology having compatibility between DC electrical properties and processability has been developed.

DISCLOSURE OF INVENTION

As described above, the space charge accumulated in the insulating material during DC loading causes distortion of the electric field in the insulating material and generates a localized high-electric field portion on positive/negative polarity reversal; hence dielectric breakdown may occur.

The inventors have earnestly investigated methods for solving the problems and discovered that the accumulation of the space charge is decreased substantially by graft polymerizing substituents having a dipole moment of not less than 4 Debye to a resin composition primarily composed of an ethylene-α-olefin copolymer polymerized with a single-site catalyst. The inventors have completed the present invention as a result of further investigation based on this discovery.

The present invention includes the following items:

(1) An electrically insulative resin that contains 60 to 90 percent by weight of ethylene-α-olefin copolymer (A) polymerized with a single-site catalyst and 40 to 10 percent by weight of a polyolefin resin(B), which is a polyolefin other than (A), wherein the resin composition contains a polyolefin that is graft polymerized with a substituent having a dipole moment of not less than 4 Debye.

(2) The electrically insulative resin composition according to Item (1), wherein the melt flow rate of the ethylene-a-olefin copolymer (A) polymerized with the single-site catalyst is 2 to 10.

(3) The electrically insulative resin composition according to Item (1), wherein the polyolefin resin (B) is at least one resin selected from the group consisting of a high-pressure low-density polyethylene; an ethylene-α-olefin copolymer that is polymerized with a Ziegler-Natta catalyst; and an ethylene-α-olefin copolymer that is polymerized with a single-site catalyst and has a melt flow rate at least 2.5 smaller than that of the copolymer (A).

(4) The electrically insulative resin composition according to Item (1), wherein the melt flow rate of the polyolefin resin (13) is 0.1 to 10.

(5) The electrically insulative resin composition according to Item (1), wherein the substituent having a dipole moment of not less than 4 Debye is prepared by graft polymerization of one or more substances selected from the group consisting of naphthalic acid, naphthalic anhydride, maleic acid, maleic anhydride, itaconic acid, crotonic acid, and naphthoic acid.

(6) An electric wire or cable characterized in that a conductor is covered with the electrically insulative resin composition according to any one of Items (1) to (5).

(7) An electric wire or cable characterized in that a semi-conductive resin composition made of an electrically insulative resin composition according to one of Items (1) to (5) to which a conductivity endower such as carbon is added is provided, as a semi-conductive layer, between a conductor and an insulating layer, and between the insulating layer and a shielding layer.

The electrically insulative resin composition according to Items (1) to (5) exhibits high resistance against DC stress, impulse stress, and polarity reversal. Furthermore, since the electrically insulative resin composition has superior extrudability, it can be advantageously used as an insulating material for covering conductors of electric wires or cables.

When a semi-conductive resin composition composed of, for example, a conventionally used ethylene-vinyl acetate copolymer (EVA) or ethylene-ethyl acrylate copolymer (EEA), to each of which a conductivity endower was added, was used as a semi-conductive layer, impurities contained in the semi-conductive resin composition migrated into an insulation, thereby causing problems, such as increased accumulation of space charge in the insulation and decreased insulating characteristics of the insulation material. Thus, the advantages of the electrically insulative resin composition according to the present invention were impaired.

If the semi-conductive resin composition prepared by adding a conductivity endower (such as carbon) to the electrically insulative resin composition according to Items (1) to (5) is used as a semi-conductive layer as described in Item (7) above, then the accumulation of space charge in the insulation material due to the composition of the semi-conductive layer can be reduced.

Accordingly, an electric wire or cable in which an electrically insulative resin composition defined in Items (1) to (5) is used as an insulation material, and a semi-conductive resin composition composed of an electrically insulative resin composition defined in Items (1) to (5) to which a conductivity endower such as carbon is added is used as a semi-conductive layer disposed between a conductor and an insulating layer, and between an insulating layer and shielding layer exhibits particularly high resistance against DC stress, impulse stress, and polarity reversal.

Thus, the present invention can provide a plastic insulated electric wire or cable having high performance for DC transmission.

The resin composition composition having an electrical insulation property according to the present invention contains 60 to 90 percent by weight of the ethylene-α-olefin copolymer (A) and 40 to 10 percent by weight of the other polyolefin resin (B). The above characteristics are satisfactorily achieved in these contents. In an (A) content of less than 60 percent by weight, electrical properties and/or processability decreases noticeably. The reasons are presumed to be as follows:

(1) A reason for increased electrical properties by the copolymer (A) is because the use of the single-site catalyst (in particular, a metallocene catalyst) causes the molecular weight distribution and the composition distribution to be uniform in the molecular weight distribution and the composition distribution are uniform in the ethylene-α-olefin copolymer and the content of the low molecular weight component to be small, and hence the proportion of the tied-molecules in the lamella structure increases and amorphous portions are reinforced accordingly.

(2) It is deemed that steep decreases in electrical properties in an (A) content of less than 60 percent by weight are caused by an increase in electrically weak amorphous portions that determine the electrical properties.

In this specification, the melt flow rate (MFR) represents the quantity in terms of weight (g) of polyolefin resin pellets that is extruded for 10 minutes at 190° C. under a load of 2.16 kg weight according to the standard of ASTM D 1238-65T.

BEST MODE FOR CARRYING OUT THE INVENTION

The present invention will now be described in further detail.

[Ethylene-α-olefin Copolymer (A)]

An ethylene-α-olefin copolymer (A) according to the present invention is prepared by random copolymerization of ethylene and α-olefin monomers in the presence of a single-site catalyst. The ethylene-α-olefin copolymer (A) preferably has an MFR of 2 to 10 so that can be processed for covering electric wires or cables as described above.

The α-olefin monomer preferably has 3 to 20 carbon atoms. Examples of α-olefin monomers include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-pentene, 3-ethyl-1-pentene, 4-methyl-1-pentene, 4-methyl-1-hexene, 4,4-dimethyl-1-pentene, 4,4-diethyl-1-pentene, 4-ethyl-1-hexene, 3-ethyl-1-hexene, 9-methyl-1-decene, 11-methyl-1-dodecene, and 12-ethyl-1-tetradecene. One kind of these α-olefin monomers may be used, or two or more kinds of them may be used in combination.

Among these α-olefin monomers, those having 4 to 10 carbons are particularly preferred, for example, propylene, 1-butene, 1-pentene, and 1-octene.

Ethylene and the α-olefin may be copolymerized by a known method using a known single-site catalyst.

[Polyolefin Resin (B)]

The polyolefin resin (B) used with the ethylene-α-olefin copolymer (A) preferably has an MFR of 0.1 to 10 in view of processability such as extrudability.

This copolymer (3) may be at least one resin selected from the group consisting of (1) a high-pressure low-density polyethylene; (2) an ethylene-α-olefin copolymer that is polymerized with a Ziegler-Natta catalyst; and (3) an ethylene-α-olefin copolymer that is polymerized with a single-site catalyst and has a melt flow rate at least 2.5 smaller than that of the copolymer (A).

The high-pressure low-density polyethylene (1) may be a polyethylene that is prepared by polymerizing ethylene with a radical polymerization initiator such as oxygen or an organic peroxide under high-temperature high-pressure conditions and that has a density in the range of 0.910 $g/cm^3$ to less than 0.930 $g/cm^3$ according to Japanese Industrial Standard (JIS) K 6748.

The ethylene-α-olefin copolymer polymerized with a Ziegler-Natta catalyst (designated by (2) above) is prepared by adding an α-olefin in polymerization of ethylene and introducing side chains having a given length to polyethylene and is defined in JIS K 6748. Examples of α-olefin monomers include 1-butene, 1-hexene, 4-methylpenetne, and 1-octene.

As for the polyolefin resin (B) designated by (3) above, an ethylene-α-olefin copolymer prepared using a single-site catalyst may be used if the MFR is at least 2.5 smaller than that of the above copolymer (A). In other words, when two ethylene-α-olefin copolymers that are prepared with single-site catalysts and have different MFRs are mixed, the resulting resin composition has electrical properties and processability desired in the present invention.

The resins (A) and (B) in the present invention may be crosslinked or uncrosslinked. When the resins are crosslinked, the decomposed residue of the crosslinking agent is removed by volatilization before use. Crosslinking may be performed by a known process using any organic peroxide, such as di-cumyl peroxide, α,α-bis(t-butyl peroxy-p-isopropyl)benzene, or 2,5-dimethyl-2,5-di(t-butyl peroxy)-hexyne-3.

[Substituent Having Dipole Moment of Not Less Than 4-Debye]

The electrically insulative resin composition of the present invention contains a polyolefin to which substituents having a dipole moment of not less than 4 Debye are graft-polymerized. Polar groups are thereby distributed uniformly in the resin composition and the space charge is trapped in the polar groups. The graft content is preferably in the range of 10 to 10,000 ppm of the composition. A graft content larger than the upper limit of this range may cause an increase in the amount of impurities (an increased unbar number) that do not pass through a screen mesh during extrusion and a decrease in physical property, i.e., crystallinity, whereas a smaller graft content than the lower limit shows an impaired charge trapping effect. As described above, examples of the substituents include one or more residual groups selected from the group consisting of residual groups of naphthalic acid, naphthalic anhydride, maleic acid, maleic anhydride, itaconic acid, crotonic acid, and naphthoic acid.

[Preparation of Electrically Insulative Resin Composition]

The electrically insulative resin composition of the present invention may be prepared by blending the resins (A) and (B) and a resin (A) or (B) to which maleic anhydride is grafted, for instance, using rolls at a temperature of 140° C. to 180° C. During the preparation, an antioxidant may be added by a known method, if necessary; however, a decrease in property caused by such an addition is not found in the electrically insulative resin composition of the present invention.

[Coating onto Conductor]

The electrically insulative resin composition may be coated onto conductors such as electric wires or cables by any general extrusion covering method. The extrusion covering may be applied directly on the conductors, or on semi-conductive layers or shielding layers provided on the conductors.

EXAMPLES 1 TO 5 AND COMPARATIVE EXAMPLES 1 TO 3

The resin materials (A) and (B) and a master batch in which maleic anhydride was graft-polymerized were kneaded on rolls at 150° C. so as to achieve compositions shown in Table I (EXAMPLES 1 to 5) and Table II (COMPARATIVE EXAMPLES 1 to 3), respectively, and the compositions thus obtained were shaped into sheet samples.

The crosslinked polyethylene (XLPE) sample in COMPARATIVE EXAMPLE 3 was kneaded at 120° C.

Each sample was tested according to the following methods. The results are shown in Tables I and II.

(Electric Properties)

Resistance against polarity reversal: Resistance against polarity reversal was evaluated by an accumulation phenomenon of the space charge causing electric field distortion on polarity reversal. That is, it was evaluated by measuring the stress magnification due to accumulation of the space charge. The closer to 1 the stress magnification is, the better.

Resistance against DC stress: Resistance against DC stress was represented by a relative value as compared to the XLPE at room temperature. It is preferable that this value be as high as possible.

Resistance against impulse stress: Resistance against impulse stress was represented by a relative value as compared to the XLPE at room temperature. It is preferable that this value be as high as possible.

(Processability)

Long-term processability: Long-term processability was evaluated by the unbar number (relative value) trapped on a 635 mesh screen during an extrusion test without crosshead using a 20-mmϕ extruder. It is preferable that this value be as low as possible.

Processability: Processability was evaluated by the resin pressure and the motor torque upstream of a breaker plate during an extrusion test without crosshead using the 20-mmϕ extruder. The extruding temperature was 140° C. (130° C. for COMPARATIVE EXAMPLE 3).

TABLE I

|  | EXAMPLES | | | | |
|---|---|---|---|---|---|
|  | 1 | 2 | 3 | 4 | 5 |
| Resin (A) | | | | | |
| MFR | 4.0 | 4.0 | 4.0 | 4.0 | 4.0 |
| Percent by weight | 70 | 60 | 70 | 70 | 70 |
| Resin (B) | | | | | |
| Type (1) | LDPE | LDPE | sLLDPE | LDPE | zLLDPE |
| MFR | 0.2 | 1.0 | 1.3 | 0.2 | 0.8 |
| Percent by weight | 30 | 30 | 30 | 30 | 30 |
| Type (2) |  | sLLDPE | | | |
| MFR |  | 1.3 | | | |
| Weight % |  | 10 | | | |
| Maleic anhydride moL/g × $10^{-7}$ | 10 | 10 | 10 | 1 | 10 |
| (Electrical Properties) | | | | | |
| Resistance against DC stress | 1.47 | 1.51 | 1.45 | 1.42 | 1.5 |
| Resistance against impulse stress | 1.32 | 1.22 | 1.36 | 1.30 | 1.31 |
| Stress magnification due to space charge | 1.11 | 1.13 | 1.11 | 1.24 | 1.10 |
| (Processability) | | | | | |
| Unbar number | 0.09 | 0.09 | 0.05 | 0.08 | 0.12 |
| Resin Pressure | 135 | 140 | 130 | 135 | 145 |
| Torque | 5.8 | 6.2 | 5.2 | 5.7 | 6.3 |

TABLE II

| | COMPARATIVE EXAMPLES | | |
|---|---|---|---|
| | 1 | 2 | 3 |
| Resin (A) | | | Crosslinked polyethylene |
| MFR | 4.0 | 4.0 | |
| Percent by weight | 50 | 50 | |
| Resin (B) | | | |
| Type | LDPE | sLLDPE | |
| MFR | 1.0 | 1.3 | |
| Percent by weight | 50 | 50 | |
| Maleic anhydride mol/g × $10^{-7}$ | 10 | 10 | — |
| (Electrical Properties) | | | |
| Resistance against DC stress | 1.48 | 1.49 | 1.0 |
| Resistance against impulse stress | 0.84 | 1.20 | 1.0 |
| Stress magnification due to space | 1.13 | 1.10 | 1.42 |
| (Processability) | | | |
| Unbar number | 0.15 | 0.12 | 1.0 |
| Resin Pressure | 125 | 160 | 98 |
| Torque | 4.5 | 6.5 | 4.5 |

In Tables I and II above, the LDPE, zLLDPE, and sLLDPE that were used were as follows:

LDPE: high-pressure low-density polyethylene [W2000 (MFR: 1.0) and C110 (MFR: 0.2) made by Japan Polyolefins Co., Ltd.]

zLLDPE: linear low-density polyethylene polymerized using a Ziegler-Natta catalyst [FZ103-0 (MFR: 0.8) made by Sumitomo Chemical Co., Ltd.]

sLLDPE: linear low-density polyethylene polymerized using a metallocene single-site catalyst [FV103 (MFR: 1.3) and FV40 1 (MFR: 4.0) made by Sumitomo Chemical Co., Ltd.]

Crosslinked polyethylene: 100 parts by weight of W2000, 2.0 parts by weight of dicumyl peroxide, and 0.2 parts by weight of 4,4'-thiobis(2-t-butyl-5-methylphenol).

As shown in COMPARATIVE EXAMPLE 3 in Table II, the crosslinked polyethylene not containing the ethylene-α-olefin copolymer (A) polymerized using the single-site catalyst has a large stress magnification of 1.42 due to space charge accumulation, indicating poor resistance against polarity reversal.

As shown in COMPARATIVE EXAMPLE 1 in Table II, in the case in which the ethylene-α-olefin copolymer (A) polymerized with the single-site catalyst is contained by 50% and LDPE is used as the resin (B), the resistance against impulse stress was as low as 0.84.

As shown in COMPARATIVE EXAMPLE 2 in Table II, in the case where the ethylene-α-olefin copolymer (A) polymerized with the single-site catalyst was contained by 50% and linear low-density polyethylene polymerized with the metallocene catalyst was used as the resin (B), the resin pressure was as high as 160, indicating poor processability.

As compared with the above COMPARATIVE EXAMPLES, EXAMPLES 1 to 5 shown in Table I exhibit excellent resistance properties against DC stress and impulse stress, stress magnification, and processability.

The invention claimed is:

1. A DC electric wire or cable comprising a conductor, an insulating layer and an external shielding layer characterized in that a semi-conductive resin composition is provided, as a semi-conductive layer, between the conductor and the insulating layer and between the insulating layer and the external shielding layer, respectively, wherein the semi-conductive resin composition is made by adding a conductivity endower to an electrically insulative resin composition, said insulative resin composition comprising
    (1) a blend of:
        resin (A) which is an ethylene-α-olefin copolymer resin polymerized with a single site catalyst, and having a melt flow rate of 2 to 10;
        and resin (B) which is an olefin polymer other than (A) having a melt flow rate of 0.1 to 7.5, and graft polymerized with a substituent having a dipole moment of not less than 4 Debye;
    or (2) a blend of:
        resin (A) at least one ethylene-α-olefin copolymer resin graft polymerized with a substitutent having a dipole moment of not less than 4 Debye;
        and resin (B) at least one olefin resin other than (A) having a melt flow rate of 0.1 to 7.5;
    or (3) a blend of:
        resin (A) at least one ethylene-α-olefin copolymer resin graft polymerized with a substitutent having a dipole moment of not less than 4 Debye;
        and resin (B) at least one olefin polymer other than (A) having a melt flow rate of 0.1 to 7.5 graft-polymerized with a substitutent having a dipole moment of not less than 4 Debye;
    wherein resin (A) component is 60 to 90% by weight and resin (B) component is 40 to 10% by weight resin (A) and resin (B) having different MFRs and the MFR of resin (B) being at least 2.5 smaller than that of resin (A);
    and wherein the melt flow rate (MFR) represents the quantity in terms of weight (g) of polyolefin resin pellets that is extruded for 10 minutes at 190°C. under a load of 2.16 kg weight according to the standard of ASTM D1238-65T.

2. The DC electric wire or cable according to claim 1, wherein the olefin resin (B) is at least one resin selected from the group consisting of a high-pressure low-density polyethylene; an ethylene-α-olefin copolymer that is polymerized with a Ziegler-Natta catalyst; and an ethylene-α-olefin copolymer that is polymerized with a single-site catalyst and has a melt flow rate at least 2.5 smaller than that of the copolymer (A).

3. The DC electric wire or cable according to claim 1, wherein the substituent having a dipole moment of not less than 4 Debye is of at least one substance selected from the group consisting of naphthalic acid, naphthalic anhydride, maleic acid, maleic anhydride, itaconic acid, crotonic acid, and naphthoic acid.

* * * * *